(12) United States Patent
Zuerl et al.

(10) Patent No.: US 7,822,692 B2
(45) Date of Patent: Oct. 26, 2010

(54) AUTOMATED CONTROL OF PRICING USING MARKDOWN PROFILES

(75) Inventors: Ruediger Zuerl, Eschelbronn (DE); Christine Fotteler, Winnetka, IL (US)

(73) Assignee: SAP AG, Walldorf (DE)

( * ) Notice: Subject to any disclaimer, the term of this patent is extended or adjusted under 35 U.S.C. 154(b) by 974 days.

(21) Appl. No.: 10/872,816

(22) Filed: Jun. 21, 2004

(65) Prior Publication Data

US 2005/0194439 A1 Sep. 8, 2005

Related U.S. Application Data

(60) Provisional application No. 60/563,284, filed on Apr. 16, 2004, provisional application No. 60/551,221, filed on Mar. 8, 2004.

(51) Int. Cl.
G06Q 99/00 (2006.01)
(52) U.S. Cl. .................. 705/400; 705/1.1; 705/8; 705/26; 705/28; 705/36
(58) Field of Classification Search .......... 705/1, 705/400, 10, 26–27, 28, 1.1, 8, 36; 707/102; 706/12
See application file for complete search history.

(56) References Cited

U.S. PATENT DOCUMENTS

| | | | |
|---|---|---|---|
| 5,400,253 A | | 3/1995 | O'Connor |
| 5,615,109 A | * | 3/1997 | Eder ............................. 705/8 |
| 5,689,696 A | * | 11/1997 | Gibbons et al. ................ 707/1 |
| 5,930,771 A | | 7/1999 | Stapp |
| 5,933,813 A | * | 8/1999 | Teicher et al. ................. 705/26 |
| 6,507,851 B1 | | 1/2003 | Fujiwara et al. |
| 6,910,017 B1 | | 6/2005 | Woo et al. |

(Continued)

FOREIGN PATENT DOCUMENTS

JP  2004-030343 A  1/2004

(Continued)

OTHER PUBLICATIONS

Subrahmanyan et al., "Developing Optimal Pricing and Inventory Policies for Retailers Who Face Uncertain Demand", Journal of Retailing, vol. 72, No. 1, Spring, 1996 (p. 7 (24)).*

(Continued)

*Primary Examiner*—John W Hayes
*Assistant Examiner*—Freda A Nelson
(74) *Attorney, Agent, or Firm*—Foley & Lardner LLP

(57) ABSTRACT

A method, program product and system for controlling pricing for sale of a product, where the method includes: selecting a markdown profile to be used for the product; selecting a retail price for the product; acquiring updated sales data regarding the product; and determining a markdown to be applied to the retail price from the markdown profile using the updated sales data. The method can further include the step of adjusting a retail price of the product by the markdown. The method, program product, and system may also provide a data structure for implementing a markdown profile by determining retail price adjustments for a product, where the data structure includes: an actual sales quota parameter; a posting period parameter arranged perpendicular to the actual sales quota parameter; and a plurality of data fields containing markdowns, each data field corresponding to a specific posting period and actual sales quota range and each markdown relating to an amount of adjustment of a retail price for the product.

26 Claims, 2 Drawing Sheets

U.S. PATENT DOCUMENTS

| | | | |
|---|---|---|---|
| 6,976,001 | B1 | 12/2005 | Levanoni et al. |
| 6,980,966 | B1 | 12/2005 | Sobrado et al. |
| 7,080,066 | B1 | 7/2006 | Scheurich et al. |
| 7,082,066 | B2 | 7/2006 | Yamada |
| 7,092,929 | B1* | 8/2006 | Dvorak et al. ............... 705/28 |
| 7,117,165 | B1 | 10/2006 | Adams et al. |
| 7,130,822 | B1 | 10/2006 | Their et al. |
| 7,139,731 | B1 | 11/2006 | Alvin |
| 7,155,402 | B1* | 12/2006 | Dvorak ..................... 705/10 |
| 7,379,890 | B2 | 5/2008 | Myr et al. |
| 7,424,440 | B1 | 9/2008 | Gupta et al. |
| 2001/0032128 | A1 | 10/2001 | Kepecs |
| 2001/0047308 | A1* | 11/2001 | Kaminsky et al. ............ 705/26 |
| 2001/0049690 | A1* | 12/2001 | McConnell et al. ...... 707/104.1 |
| 2002/0023500 | A1 | 2/2002 | Chikuan et al. |
| 2002/0059108 | A1 | 5/2002 | Okura et al. |
| 2002/0078159 | A1 | 6/2002 | Petrogiannis et al. |
| 2002/0107713 | A1 | 8/2002 | Hawkins |
| 2002/0123930 | A1 | 9/2002 | Boyd et al. |
| 2002/0138336 | A1 | 9/2002 | Bakes et al. |
| 2002/0147668 | A1 | 10/2002 | Smith et al. |
| 2003/0023500 | A1 | 1/2003 | Boies et al. |
| 2003/0028437 | A1 | 2/2003 | Grant et al. |
| 2003/0046195 | A1 | 3/2003 | Mao |
| 2003/0158791 | A1 | 8/2003 | Gilberto et al. |
| 2003/0172007 | A1 | 9/2003 | Helmolt et al. |
| 2003/0229502 | A1 | 12/2003 | Woo |
| 2004/0034580 | A1* | 2/2004 | Okamura ................... 705/28 |
| 2004/0098358 | A1 | 5/2004 | Roediger |
| 2004/0162763 | A1 | 8/2004 | Hoskin et al. |
| 2004/0186783 | A1 | 9/2004 | Knight et al. |
| 2004/0199536 | A1* | 10/2004 | Barnes Leon et al. ....... 707/102 |
| 2004/0220861 | A1 | 11/2004 | Morciniec et al. |
| 2005/0055283 | A1 | 3/2005 | Zarovinsky |
| 2005/0060270 | A1 | 3/2005 | Ramakrishnan |
| 2005/0086122 | A1 | 4/2005 | Cirulli et al. |
| 2005/0096963 | A1 | 5/2005 | Myr et al. |
| 2005/0102192 | A1 | 5/2005 | Gerrits et al. |
| 2005/0102227 | A1 | 5/2005 | Solonchev |
| 2005/0165659 | A1 | 7/2005 | Gruber |
| 2005/0197946 | A1* | 9/2005 | Williams et al. ............. 705/36 |
| 2006/0036507 | A1 | 2/2006 | Pujar et al. |
| 2007/0276537 | A1* | 11/2007 | Walker et al. .............. 700/238 |

OTHER PUBLICATIONS

Lapide, Larry, "A Simple Approach for Short Product Lifecycle Forecasting"; Spring 2001, The Journal of Business Forecasting Methods & Systems, pp. 18-20, 3pgs.*

ProfitLogic, available at http://web.archive.org/web/2002060311838/http://profitlogic.com/, available at least by Apr. 15, 2005 (22 pp.).

Subrahmanyan et al., "Developing optimal pricing and inventory policies for retailers who face uncertain demand", Journal of Retailing, vol. 72, No. 1, Spring, 1996 (p. 7 (24)).

U.S. Appl. No. 60/374,892, filed Apr. 22, 2002, Krajec, Russell.

Achabal, Dale D., PhD, Achieving Business Advantage in Retail Through Advanced Analytics, 2003 Milan Meeting of the Minds, infosys.com/Milan, 31 pgs.

Beyond Markdown Management, Summer/Autumn 03, The 4caster, Iss. 4, vol. 2, 4 pages.

Melcer, Rachel, Local Tech Firm Creates Retail Markdown Tool, Business Courier of Cincinnati, Mar. 24, 2000, 3 pages.

Notice of Allowance for U.S. Appl. No. 10/919,025, mail date Sep. 18, 2008, 4 pages.

Office Action for U.S. Appl. No. 10/900,975, mail date Apr. 26, 2005, 16 pages.

Office Action for U.S. Appl. No. 10/900,975, mail date Apr. 4, 2008, 18 pages.

Office Action for U.S. Appl. No. 10/900,975, mail date Apr. 7, 2006, 9 pages.

Office Action for U.S. Appl. No. 10/900,975, mail date Aug. 13, 2007, 18 pages.

Office Action for U.S. Appl. No. 10/900,975, mail date Feb. 23, 2009, 21 pages.

Office Action for U.S. Appl. No. 10/900,975, mail date Feb. 8, 2007, 13 pages.

Office Action for U.S. Appl. No. 10/900,975, mail date Jan. 26, 2010, 31 pages.

Office Action for U.S. Appl. No. 10/900,975, mail date Jun. 25, 2009, 31 pages.

Office Action for U.S. Appl. No. 10/900,975, mail date Oct. 10, 2006, 14 pages.

Office Action for U.S. Appl. No. 10/900,975, mail date Oct. 20, 2005, 10 pages.

Office Action for U.S. Appl. No. 10/900,995, mail date Apr. 15, 2010, 14 pages.

Office Action for U.S. Appl. No. 10/900,995, mail date Apr. 17, 2008, 14 pages.

Office Action for U.S. Appl. No. 10/900,995, mail date Mar. 22, 2007, 14 pages.

Office Action for U.S. Appl. No. 10/900,995, mail date May 20, 2009, 20 pages.

Office Action for U.S. Appl. No. 10/900,995, mail date Oct. 28, 2008, 15 pages.

Office Action for U.S. Appl. No. 10/900,995, mail date Oct. 4, 2007, 15 pages.

Office Action for U.S. Appl. No. 10/900,995, mail date Oct. 5, 2009, 14 pages.

Office Action for U.S. Appl. No. 10/903,891, mail date Apr. 25, 2005, 12 pages.

Office Action for U.S. Appl. No. 10/903,891, mail date Apr. 7, 2006, 10 pages.

Office Action for U.S. Appl. No. 10/903,891, mail date May 4, 2007, 17 pages.

Office Action for U.S. Appl. No. 10/903,891, mail date Oct. 10, 2006, 17 pages.

Office Action for U.S. Appl. No. 10/903,891, mail date Oct. 21, 2005, 9 pages.

Office Action for U.S. Appl. No. 10/919,025, mail date Feb. 28, 2007, 7 pages.

Office Action for U.S. Appl. No. 10/919,025, mail date Mar. 21, 2008, 12 pages.

Office Action for U.S. Appl. No. 10/919,025, mail date Sep. 25, 2007, 11 pages.

Office Action for U.S. Appl. No. 10/931,936, mail date Apr. 10, 2009, 15 pages.

Office Action for U.S. Appl. No. 10/931,936, mail date Mar. 25, 2010, 23 pages.

Office Action for U.S. Appl. No. 10/931,936, mail date Nov. 24, 2009, 22 pages.

Retailers Manage Markdown Challenges Using i2 Solutions, Jan. 13, 2003, NRF 92nd Annual Convention & Expo, 2 pages.

Staffware: Staffware And Biomni Join Forces To Provide End-To-End E-Procurement Solution With Enhanced Workflow Capability: Self-Service Functionality Will Enable Thousands Of Transactions To Be Handled Daily From The Desktop, M2 Presswire, Coventry, Feb. 6, 2001, 2 pages.

Sun and ProfitLogic Help Leading Retailer Optimize Markdowns to Increase Profits, Apr. 2003, Onthewebsun.com/retail, 4 pgs.

* cited by examiner

AUTOMATED CONTROL OF PRICING USING MARKDOWN PROFILES

PRIORITY

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

A. Field of the Invention

The present invention is directed to the field of retail pricing and specifically to the use of automated pricing with markdown profiles to reach sales quotas.

B. Background

Effective pricing of goods that are made available for sale is often a complicated task. In order to maximize profits, not only must revenue be optimized, but also the costs of inventory must be taken into account. One strategy used is to periodically reduce the price of the goods, effecting a markdown, in order to encourage sales of the goods. The amount of the markdown is often set by a sales agent who has had experience in the market for the goods and can, using his or her experience and intuition determine the timing and amount of markdowns.

In particular, the sale of seasonal goods poses a high financial risk for merchants. Each seasonal product can be assigned a specific sales period. When high-fashion and fashion products are involved, the merchant wants to have as little remaining stock as possible at the end of the sales period, as it will be difficult to sell this merchandise even with markdowns. In this case, larger remaining stocks translate to higher losses. In addition to fashion products, such as pink raincoats, this also applies to other goods, such as computer hardware.

For less "fashionable" products, the risk is lower because merchants can store any remaining stock and then try to sell it at the normal price again in the same season of the next year. Because storing inventories is expensive, however, merchants will generally prefer to sell their merchandise by the end of the regular sales period.

Merchants use markdowns to ensure that the merchandise is sold out as completely as possible by the end of a season. Markdowns are price reductions or buyer's incentives aimed at promoting the sale of certain products. Of course, markdowns reduce the gross margin, which means the revenue merchants earn for selling the merchandise is less than originally planned. Merchants usually plan a certain budget for markdowns that must not be exceeded. Accordingly, markdowns are applied restrictively in retail, which once again increases the risk of remaining stocks at the end of the season.

Therefore, the primary goal in managing seasonal merchandise is to limit markdowns to a minimum and apply them at the best suitable time, while ensuring that nearly all the merchandise is sold by the end of the season.

SUMMARY OF THE INVENTION

The present invention, as described herein, provides a method, program product, and system for controlling pricing for sale of a product, where the method of the present invention includes: selecting a markdown profile to be used for the product; selecting a retail price for the product; acquiring updated sales data regarding the product; and determining a markdown to be applied to the retail price from the markdown profile using the updated sales data. The method can further comprise the step of adjusting a retail price of the product by the markdown.

The present invention also provides a data structure implementing a markdown profile for determining retail price adjustments for a product, including: an actual sales quota parameter; a posting period parameter arranged perpendicular to the actual sales quota parameter; and a plurality of data fields containing markdowns, each data field corresponding to a specific posting period and actual sales quota range and each markdown relating to an amount of adjustment of a retail price for the product.

The present invention also provides a method and program product for using a markdown profile to determine that a product or service is a bestseller. The method includes: selecting a markdown profile to be used for the product or service, selecting a retail price for the product or service, acquiring updated sales data regarding the product or service, determining that the product or service is a bestseller if the updated sales data exceeds a target sales quota in the markdown profile for a given posting period.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

As mentioned above, the primary goal in managing seasonal merchandise is to limit markdowns to a minimum and apply them at the best suitable time, while ensuring that nearly all the merchandise is sold by the end of the season. The present invention, as defined in detail herein, is a tool that supports a pricing agent's work during the ongoing retail season. The agent forms a correspondence between a product and markdown profile. This markdown profile contains time-specific target data for selling a product during its retail life cycle. The sales data of a product that sold well in the previous year, for example, could be used as the target sales quota in a markdown profile. The markdown profile is tied to a pricing strategy, which dictates specific price reductions when the actual sales data deviates from the target data. As a result, the system is capable of monitoring the sales data automatically and notifying the agent of any exceptions that occur. In addition, the system can propose certain markdowns in order to reach the planned sales figures. In this approach, the agent is relieved from a large portion of the activities he or she usually has to perform. Using the markdown profile, the agent can obtain proposed markdowns for a given product at periodic intervals over the life cycle of the sale of that product. The agent can choose to accept or reject the proposals, but it is envisioned that in most cases, the proposals will be accepted and the goal of ensuring that nearly all the merchandise is sold by the end of the season is achieved.

Figure 1:
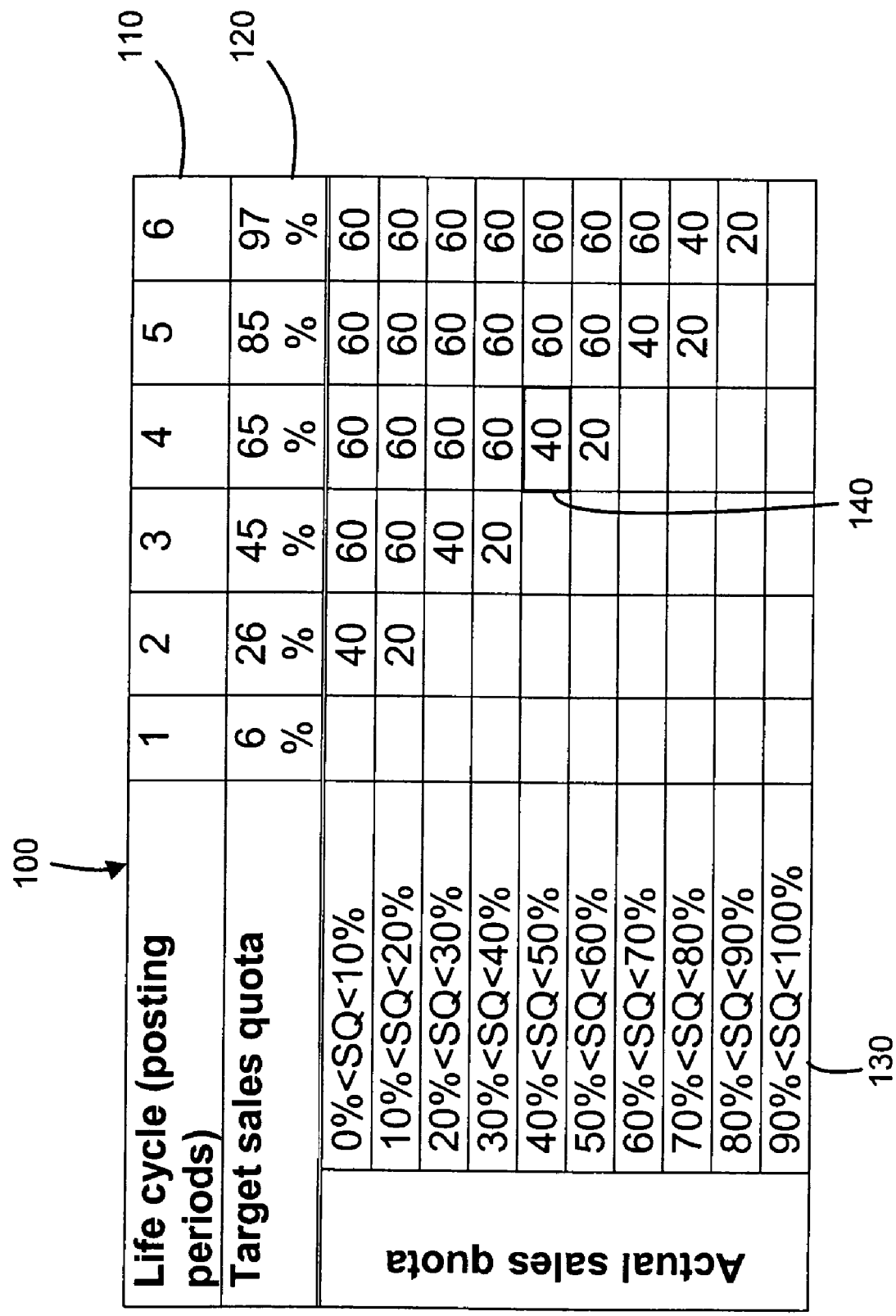
FIG. 1 illustrates a markdown profile in accordance with a preferred embodiment of the invention.

The structure of the markdown profile in the preferred embodiment of the invention is illustrated in FIG. 1. The markdown profile 100 specifies the target sales figures for the product, that is, the sales quotas for which no markdowns are needed. These target sales quotas are shown in row 120 in FIG. 1. The target sales quotas are shown in connection with a time reference which can represent a retail life cycle of the product. In FIG. 1, the target sales quotas 120 are shown in connection with corresponding numbered time periods 110 over the life cycle of the product, also known as posting periods. For example, a posting period may correspond to a week in the season of the product.

The target sales quotas are expressed as percentages in the markdown profile shown in FIG. 1. These percentages represent the quantity of the goods sold divided by the quantity of the goods available for sale. Thus, in the example shown in FIG. 1, at the end of the first posting period the target sales quota is six percent. At the end of the second posting period the target sales quota is 26 percent. By the end of the sixth posting period, most of the retail product, that is 97 percent, is targeted to have been sold. As shown in the markdown profile in FIG. 1, these target sales quotas are arranged along an axis in the table. Arranged perpendicular to the target sales quota axis is a plurality of rows representing ranges of actual sales quotas. These are shown as column 130 in FIG. 1. As with target sales quota, actual sales quota is calculated by taking the actual quantity of goods sold and dividing it by the quantity of goods available for sale. Each of the ten ranges of actual sales quota shown in column 130 represent 10 percent intervals. It would apparent to one skilled in the art that any number of ranges or actual percentages could be used. The thresholds for the actual sales quota can be freely defined by the user.

In the markdown profile, at the intersection of each actual sales quota range and each target sales quota corresponding to a posting period lies a cell which contains the proposed markdown. Cells in which no numbers appear indicate that no markdown is proposed. For cells in which numbers do appear, the number indicates the proposed markdown percentage. For example, assume that the markdown profile shown in FIG. 1 is being used for a retail product that has been on sale for four posting periods (or four weeks). The sales quota targeted for this product is 65 percent, as shown in target sales quota row 120. Now assume that sales of this product have not met the targeted sales quota and, instead, only 235 out of the 500 items that were in stock have sold. This corresponds to an actual sales quota of 47 percent. Thus, using the markdown profile with the actual sales quota of 47 percent falling within the range of 40 percent to 50 percent, we look to the cell found at the intersection of this actual sales quota range with the target sales quota column of 65 percent and find the number 40 in cell 140. This indicates a proposed markdown of 40 percent.

Thus, in the example described above, the system would indicate to the user that a markdown of 40 percent of the original retail price is proposed. The user can then accept or reject this proposal. In an alternate embodiment of the invention, the proposed markdown from the markdown profile is automatically implemented to adjust the retail price of the product. The user can override this automatic adjustment. The process is repeated at subsequent posting periods over the retail life cycle of the product.

While percentage markdowns are shown in the markdown profile illustrated in FIG. 1, it is envisioned that other types of buying incentives could be used instead of a simple percentage markdown of retail price. For example, a markdown profile could propose a distribution of a coupon in order to encourage sales to achieve the target sales quota.

It is important to note that the computer system on which the markdown profile is running and implemented has access to the data necessary to propose the markdown to the user. That is the system has access to the actual sales from the relevant store or stores for the relevant product or products during the relevant posting periods. It is envisioned that multiple markdown profiles would be provided to the user. These multiple profiles would correspond to different types of products or perhaps would be specific to individual products. The user could also create new profiles or revise existing profiles as desired.

In order to better control pricing for the sale of the retail product under the present invention using markdown profiles, a user would select a markdown profile to be used for the retail product at issue. The user would also select the initial retail price for that product and then as time progressed would adjust the retail price of that product by the markdown determined from the markdown profile as described above. This adjustment could happen multiple times over the life cycle of the product. The system can be programmed to perform the adjusting step at regular intervals such as at the end of each posting period. In this case it is envisioned that for a product selling well no mark-down may be necessary under certain posting periods.

Not shown in FIG. 1 is a data field associated with a markdown profile that pertains to some product characteristic. This data field allows for a markdown profile to be identified as relevant to a specific retail product or to a specific category of retail products.

While, in FIG. 1, the markdown profile is shown as a table, is would be apparent to one skilled in the art that any suitable configuration could be used to convey the same information and all such configurations would be within the scope of the present invention. Furthermore, the markdown profiles can represent information about the sales of a product in a given store or for a group of stores. It could also represent information about the sales of a group or category of products.

Figure 2:
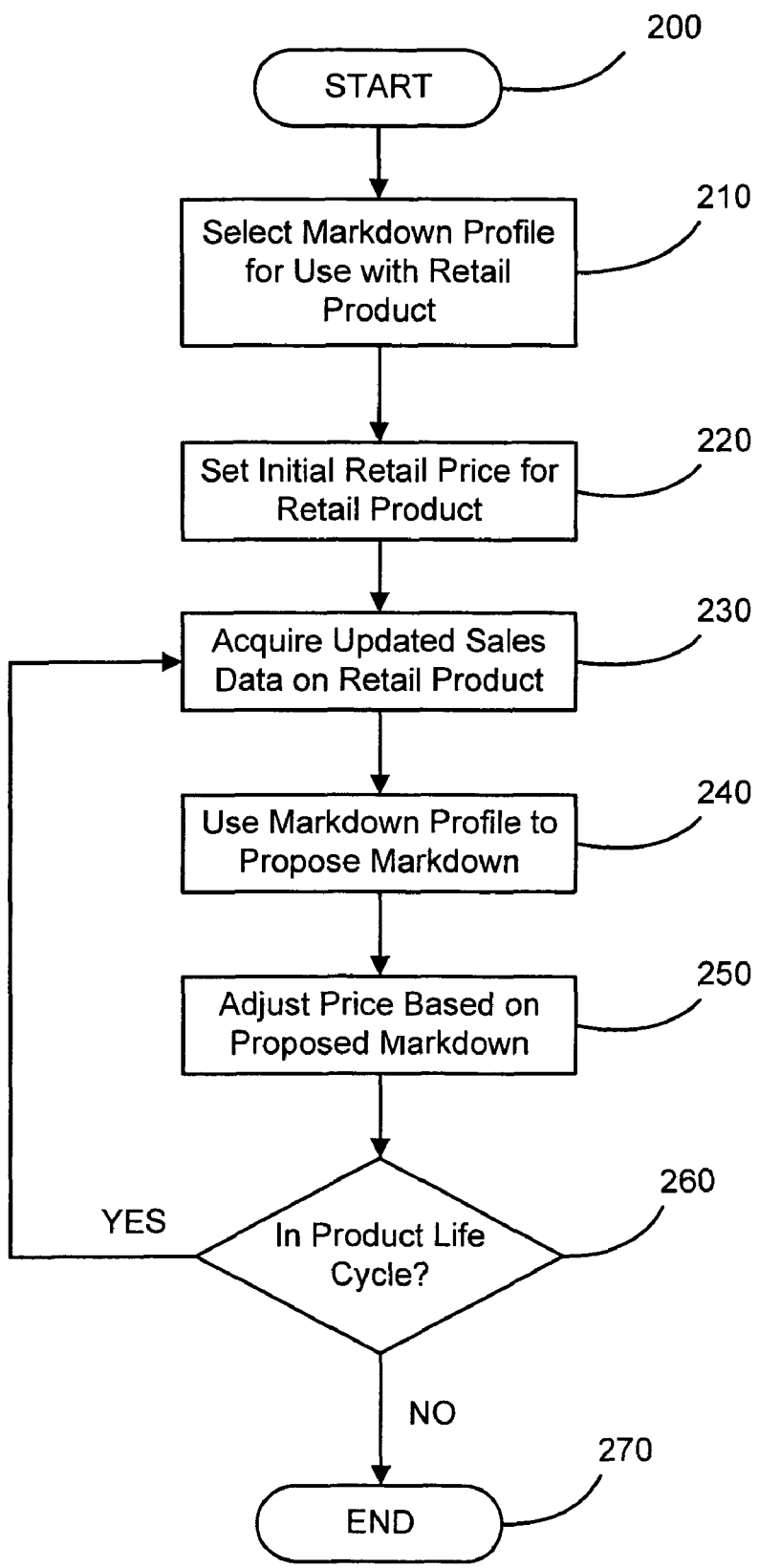
FIG. 2 is a flowchart illustrating basic price control under the present invention.

FIG. 2 illustrates the method of the present invention in a flowchart. The flowchart begins at step 200. In step 210, the user or the system selects a markdown profile to be used for a retail product. In step 220, which may be performed before, after or contemporaneously with step 210, the initial retail price of the product is set. Step 230 illustrates the acquisition of updated sales data after some period of time has elapsed while the product has been on sale. This sales data is used in step 240 in the markdown profile to determine the proposed markdown for the retail product. This proposed markdown can be used to adjust, in step 250, the retail price of the product. In one embodiment of the invention, the proposed markdown is subject to approval or rejection by a user (not shown) and, in the case of rejection, the adjustment step 250 would not need to be performed. In either case, the method returns to acquiring updated sales data, so long as it is still within the product lifecycle, step 260. The frequency of acquiring updated sales data and determining a markdown can be adjusted by the user. In the preferred embodiment, it is performed once per posting period. Once the life cycle of product has been exhausted, it is assumed that the product will not be offered for sale until some later time, if at all, and the use of the markdown profile is ended in step 270.

In another exemplary embodiment of the present invention, the markdown profile, and specifically, the target sales quota of the markdown profile for a specific product or service, can be used to determine so-called "bestsellers." That is, instead of determining the amount by which to mark down the price of the product or service due to slow sales, the markdown profile can be used to determine if the product or service is selling more quickly than anticipated. The target sales quota for a given posting period is compared with the actual sales and if the actual sales exceeds the target sales quota, the product or service is deemed to be a "bestseller." Alternatively, the user can define a percentage or amount by which the actual sales must exceed the target sales quota in order for the product or service to be deemed a bestseller. The determination that a product or service is a bestseller is then stored in a business warehouse.

"Article," "seasonal good," "product" and "retail product" are terms used herein to refer to the merchandise being sold, the pricing for which is controlled or affected by the markdown profile as used in the present invention. It is envisioned that the present invention will be applicable to the sale of any type of good or service.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. Non-transitory machine-readable media for controlling pricing for sale of a product using an automated process, the non-transitory machine-readable media comprising program code stored therein executable by one or more machines to perform the automated process, the automated process comprising:

selecting a markdown profile to be used for the product;
selecting a retail price for the product;
determining a target sales quota for the product;
acquiring by a program module sales data regarding the product;
comparing by the program module the sales data to the target sales quota;
determining by the program module a best seller based on a sales data to target sales quota comparison;

determining by the program module that the product is within a product lifecycle;
when the product is within the product lifecycle, acquiring by the program module updated sales data regarding the product;
determining by the program module whether the product is still the best seller based on an updated sales data to target sales quota comparison;
when the product is not within the product lifecycle, ending the automated process;
storing at least one of a determination that the product is the best seller and data related to ending the automated process;
wherein the best seller determination is based on at least one of a sales data to target sales quota comparison and an updated sales data to target sales quota comparison.

2. The machine-readable media for controlling pricing for sale of a product according to claim 1, wherein the determination of the best seller is further based on the actual sales data exceeding the targeted sales by a predetermined amount.

3. The machine-readable media for controlling pricing for sale of a product according to claim 1, wherein the determination of the best seller is further based on the actual sales data exceeding the targeted sales by a predetermined percentage.

4. The machine-readable media for controlling pricing for sale of a product according to claim 1, further comprising determining by the program module a slow seller based on the updated sales data to sales plan comparison and determining by the program module a markdown to be applied to the product from the markdown profile based on the updated sales data to sales plan comparison.

5. The machine-readable media for controlling pricing for sale of a product according to claim 4, further comprising adjusting by the program module the retail price of the product by the markdown.

6. The machine-readable media for controlling pricing for sale of a product according to claim 5, wherein the markdown is expressed as a buying incentive.

7. The machine-readable media for controlling pricing for sale of a product according to claim 6, wherein the buying incentive is a volume discount.

8. The machine-readable media for controlling pricing for sale of a product according to claim 1, wherein the markdown profile comprises:
an actual sales quota parameter comprising a plurality of actual sales quota ranges;
a posting period parameter arranged perpendicular to the actual sales quota parameter comprising a plurality of posting periods; and
a plurality of data fields containing markdowns, each data field corresponding to a specific posting period and actual sales quota range and each markdown relating to an amount of adjustment of the retail price for the product.

9. The machine-readable media for controlling pricing for sale of a product according to claim 1, wherein the determining that the product is within the product lifecycle step is performed automatically at regular intervals.

10. The machine-readable media for controlling pricing for sale of a product according to claim 9, wherein the determining that the product is within the product lifecycle step is performed after a posting period for the sale of the product.

11. A system for controlling pricing for sale of a product using an automated process, comprising:
means for selecting a markdown profile to be used for the product;
means for selecting a retail price for the product;
means for determining a target sales quota for the product;
means for acquiring sales data regarding the product;
means for comparing the sales data to the target sales quota;
means for determining a best seller based on a sales data to target sales quota comparison;
means for determining that the product is within a product lifecycle;
when the product is within the product lifecycle, acquiring updated sales data regarding the product;
means for determining whether the product is still the best seller based on an updated sales data to target sales quota comparison;
when the product is not within the product lifecycle, ending the automated process;
means for storing at least one of a determination that the product is the best seller and data related to ending the automated process;
wherein the best seller determination is based on at least one of a sales data to target sales quota comparison and an updated sales data to target sales quota comparison.

12. The system according to claim 11, wherein the determination of the best seller is further based on the actual sales data exceeding the targeted sales by a predetermined amount.

13. The system according to claim 11, wherein the determination of the best seller is further based on the actual sales data exceeding the targeted sales by a predetermined percentage.

14. The system according to claim 11, further comprising means for determining a slow seller based on the updated sales data to sales plan comparison and means for determining a markdown to be applied to the product or service from the markdown profile based on the updated sales data to sales plan comparison.

15. The system according to claim 14, further comprising means for adjusting the retail price of the product by the markdown.

16. The system according to claim 15, wherein the markdown is expressed as a buying incentive.

17. The system according to claim 16, wherein the buying incentive is a volume discount.

18. The system according to claim 11, wherein the markdown profile comprises:
an actual sales quota parameter comprising a plurality of actual sales quota ranges;
a posting period parameter arranged perpendicular to the actual sales quota parameter comprising a plurality of posting periods; and
a plurality of data fields containing markdowns, each data field corresponding to a specific posting period and actual sales quota range and each markdown relating to an amount of adjustment of the retail price for the product.

19. The system according to claim 11, wherein the determining that the product is within the product lifecycle step is performed automatically at regular intervals.

20. The system according to claim 19, wherein the determining that the product is within the product lifecycle step is performed after a posting period for the sale of the product.

21. Non-transitory machine-readable media for controlling pricing for sale of a product using an automated process, the non-transitory machine-readable media comprising program code stored therein executable by one or more machines to perform the automated process, the automated process comprising:

selecting a first markdown profile to be used for a first product;
selecting a second markdown profile to be used for a second product selecting a first retail price for the first product;
selecting a second retail price for the second product;
determining a first target sales quota for the first product;
determining a second target sales quota for the second product;
acquiring by a program module first sales data regarding the first product;
acquiring by the program module second sales data regarding the second product comparing by the program module the first sales data to the first target sales quota;
comparing by the program module the second sales data to the second target sales quota;
determining by the program module a slow seller based on comparing the first sales data to the first target sales quota;
determining by the program module a best seller based on comparing the second sales data to the second target sales quota;
determining by the program module that the first product is within a first product lifecycle;
determining by the program module that the second product is within a second product lifecycle;
when the first product is within the first product lifecycle, acquiring by the program module a first product updated sales data;
when the second product is within the second product lifecycle, acquiring by the program module a second product updated sales data;
determining by the program module whether the first product is still the slow seller based on comparing the first product updated sales data to the first target sales quota;
determining by the program module whether the second product is still the best seller based on comparing the second product updated sales data to the second target sales quota;
when the first product is not within the first product lifecycle, ending a first portion of the automated process relating to the first product;
when the second product is not within the second product lifecycle, ending a second portion of the automated process relating to the second product;
storing at least one of a determination that the first product is the slow seller, the second product is the best seller and data related to ending the first portion of the automated process, and data related to ending the second portion of the automated process;
wherein the best seller determination is based on at least one of a second sales data to second target sales quota comparison and a second product updated sales data to second target sales quota comparison;
wherein the slow seller determination is based on a first sales data to first target sales quota comparison and a first product updated sales data to first target sales quota comparison.

22. The machine-readable media of claim 21, further determining by the program module an exception to the first sales plan based on the first updated sales data.

23. The machine-readable media of claim 22, further comprising determining by the program module a markdown to be applied to the first retail price from the markdown profile using at least one of the exception and the first updated sales data.

24. The machine-readable media of claim 23, further comprising the step of adjusting by the program module the first retail price by the markdown.

25. The machine-readable media of claim 24, wherein the markdown is expressed as a percentage discount.

26. The machine-readable media of claim 25, wherein the markdown profile comprises a plurality of markdown percentages relating to an amount of adjustment of the first retail price.

* * * * *